(12) United States Patent
Atsumi

(10) Patent No.: US 9,174,627 B2
(45) Date of Patent: Nov. 3, 2015

(54) HYBRID VEHICLE, CONTROL METHOD FOR HYBRID VEHICLE, AND RECORDING MEDIUM RECORDED WITH A CONTROL PROGRAM FOR HYBRID VEHICLE

(75) Inventor: Yoshiaki Atsumi, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 1379 days.

(21) Appl. No.: 12/448,693

(22) PCT Filed: Feb. 6, 2008

(86) PCT No.: PCT/JP2008/052389
§ 371 (c)(1),
(2), (4) Date: Jul. 1, 2009

(87) PCT Pub. No.: WO2008/099862
PCT Pub. Date: Aug. 21, 2008

(65) Prior Publication Data
US 2010/0094493 A1 Apr. 15, 2010

(30) Foreign Application Priority Data

Feb. 13, 2007 (JP) ................. 2007-032169

(51) Int. Cl.
*B60W 20/00* (2006.01)
*B60W 10/08* (2006.01)
(Continued)

(52) U.S. Cl.
CPC ............... *B60W 10/08* (2013.01); *B60K 6/28* (2013.01); *B60K 6/365* (2013.01); *B60K 6/445* (2013.01);
(Continued)

(58) Field of Classification Search
CPC .......... B60K 6/28; B60K 6/365; B60K 6/445; B60K 1/02; F02D 29/06; F02D 41/0032; F02D 41/062; F02D 41/1454; F02M 25/08; F02M 2025/0881; F02N 11/0814; B60L 11/123; B60L 11/14; B60L 11/1811; B60L 15/007; B60L 2210/20; B60L 2240/421; B60L 2240/423; B60L 2240/441; B60L 2240/662; B60L 2240/80; B60L 2260/54; B60L 2260/56; B60W 10/06; B60W 10/08; B60W 20/00; B60W 2540/10; B60W 2560/04; B60W 2510/0619; B60W 2510/0638; B60W 2510/0685; B60W 2510/081; B60W 2510/244; B60W 2520/10; B60W 2540/06; B60W 2550/12; B60W 2710/0616; B60W 2710/083; F02P 5/152; Y02T 10/6217; Y02T 10/6239; Y02T 10/6269; Y02T 10/6278; Y02T 10/6286; Y02T 10/642; Y02T 10/7005; Y02T 10/7077; Y02T 10/725; Y02T 10/7291; Y02T 90/127; Y02T 90/14; Y02T 90/16; Y02T 10/48
USPC ........ 123/517, 519, 520; 180/62.265, 62.275, 180/62.27, 62.28, 65.265, 65.275, 65.27, 180/65.28; 701/22, 1, 36, 99, 102, 113
See application file for complete search history.

(56) References Cited

U.S. PATENT DOCUMENTS 3,870,855 A * 3/1975 Edlund et al. ................. 219/202
5,012,070 A * 4/1991 Reed ............................. 219/202
(Continued)

FOREIGN PATENT DOCUMENTS

JP A-06-233410 8/1994
JP A-08-037703 2/1996
(Continued)

*Primary Examiner* — Stephen Holwerda
(74) *Attorney, Agent, or Firm* — Oliff PLC

(57) ABSTRACT

A hybrid vehicle configured to allow charging from a source external to the vehicle includes a connector electrically connecting a battery with an external commercial power supply, an absorption unit absorbing fuel vapor, and an activation unit activating the absorption unit to facilitate disengagement of the fuel vapor during connection of the power storage device with the external power supply by the connector. The absorption unit includes a canister to which fuel vapor adheres. The activation unit includes a heater receiving electric power from at least one of the battery and external power supply to heat the canister. The hybrid vehicle further includes a purge mechanism conducting a purge relative to the canister. Thus, there can be provided a hybrid vehicle that can process fuel evaporating gas without reducing the EV allowed travel distance.

6 Claims, 8 Drawing Sheets

(51) Int. Cl.

| | |
|---|---|
| *B60K 6/365* | (2007.10) |
| *B60K 6/445* | (2007.10) |
| *B60L 11/12* | (2006.01) |
| *B60L 11/14* | (2006.01) |
| *B60L 11/18* | (2006.01) |
| *B60L 15/00* | (2006.01) |
| *B60W 10/06* | (2006.01) |
| *F02D 29/06* | (2006.01) |
| *F02D 41/00* | (2006.01) |
| *F02M 25/08* | (2006.01) |
| *F02N 11/08* | (2006.01) |
| *B60K 6/28* | (2007.10) |
| *B60K 1/02* | (2006.01) |
| *F02D 41/06* | (2006.01) |
| *F02D 41/14* | (2006.01) |
| *F02P 5/152* | (2006.01) |

(52) U.S. Cl.
CPC ............. *B60L 11/123* (2013.01); *B60L 11/14* (2013.01); *B60L 11/1811* (2013.01); *B60L 15/007* (2013.01); *B60W 10/06* (2013.01); *B60W 20/00* (2013.01); *F02D 29/06* (2013.01); *F02D 41/0032* (2013.01); *F02M 25/08* (2013.01); *F02N 11/0814* (2013.01); *B60K 1/02* (2013.01); *B60L 2210/20* (2013.01); *B60L 2240/421* (2013.01); *B60L 2240/423* (2013.01); *B60L 2240/441* (2013.01); *B60L 2240/662* (2013.01); *B60L 2240/80* (2013.01); *B60L 2260/54* (2013.01); *B60L 2260/56* (2013.01); *B60W 2510/0619* (2013.01); *B60W 2510/0638* (2013.01); *B60W 2510/0685* (2013.01); *B60W 2510/081* (2013.01); *B60W 2510/244* (2013.01); *B60W 2520/10* (2013.01); *B60W 2540/06* (2013.01); *B60W 2540/10* (2013.01); *B60W 2550/12* (2013.01); *B60W 2560/04* (2013.01); *B60W 2710/0616* (2013.01); *B60W 2710/083* (2013.01); *F02D 41/062* (2013.01); *F02D 41/1454* (2013.01); *F02M 2025/0881* (2013.01); *F02P 5/152* (2013.01); *Y02T 10/48* (2013.01); *Y02T 10/6217* (2013.01); *Y02T 10/6239* (2013.01); *Y02T 10/6269* (2013.01); *Y02T 10/6278* (2013.01); *Y02T 10/6286* (2013.01); *Y02T 10/642* (2013.01); *Y02T 10/7005* (2013.01); *Y02T 10/7077* (2013.01); *Y02T 10/725* (2013.01); *Y02T 10/7291* (2013.01); *Y02T 90/127* (2013.01); *Y02T 90/14* (2013.01); *Y02T 90/16* (2013.01)

(56) References Cited

U.S. PATENT DOCUMENTS

| | | | | |
|---|---|---|---|---|
| 5,285,963 | A | * | 2/1994 | Wakefield et al. ............ 237/2 A |
| 5,291,960 | A | * | 3/1994 | Brandenburg et al. .... 180/65.27 |
| 5,366,151 | A | * | 11/1994 | King et al. ................... 237/2 A |
| 5,371,412 | A | | 12/1994 | Iwashita et al. |
| 5,497,941 | A | * | 3/1996 | Numazawa et al. .......... 237/2 A |
| 5,664,635 | A | | 9/1997 | Koga et al. |
| 6,659,087 | B1 | * | 12/2003 | Reddy ............................. 123/520 |
| 7,769,505 | B2 | * | 8/2010 | Rask et al. ....................... 701/22 |
| 2001/0032621 | A1 | * | 10/2001 | Kojima et al. ................. 123/492 |
| 2004/0007403 | A1 | * | 1/2004 | Tomatsuri et al. ........... 180/65.2 |
| 2005/0109327 | A1 | * | 5/2005 | Reddy ............................ 123/519 |
| 2006/0016412 | A1 | * | 1/2006 | Butcher et al. ............. 123/179.3 |
| 2008/0098972 | A1 | * | 5/2008 | Elwart .................... 123/142.5 E |
| 2009/0071428 | A1 | * | 3/2009 | Kamiyama et al. .... 123/142.5 R |

FOREIGN PATENT DOCUMENTS

| | | |
|---|---|---|
| JP | A-11-343890 | 12/1999 |
| JP | A-2007-196967 | 8/2007 |

* cited by examiner

HYBRID VEHICLE, CONTROL METHOD FOR HYBRID VEHICLE, AND RECORDING MEDIUM RECORDED WITH A CONTROL PROGRAM FOR HYBRID VEHICLE

TECHNICAL FIELD

The present invention relates to a hybrid vehicle, a control method for a hybrid vehicle, a control program for a hybrid vehicle, and a recording medium recorded with the program.

BACKGROUND ART

A hybrid vehicle that uses both a motor and engine for driving the wheels are now attracting attention as ecologically-friendly vehicles. Research on a configuration allowing charging from an external source for such hybrid vehicles is in progress. This is advantageous in that the number of times the driver has to go to a gas station to supply fuel is reduced by conducting charging at the residence and the like. There is also an advantage in terms of cost by using economic midnight power.

Japanese Patent Laying-Open No. 8-37703 discloses a hybrid vehicle including a battery that can be charged by external charge means, an electric motor that can drive the wheels based on the electric power from the battery, an engine used to drive the wheels, and control means for controlling the operation of the electric motor and engine.

By frequently charging the battery from an external power supply based on such a configuration that allows charging from an external power supply for the vehicle, the frequency of operating the engine can be reduced by maintaining the SOC (State of Charge) of the battery constantly at a favorable level. It is possible to envisage an event of such charging operation in the case where the cost required for charging through external electric power is lower than the cost of fuel required to operate the engine.

It is noted that, when the engine is left without being operated for a long period of time, fuel vapor will be generated significantly if the temperature is high. For example, a great amount of evaporating gas of gasoline will be generated in the gasoline tank in the case where a gasoline engine is employed. If the amount of evaporating gas is so great that it cannot be trapped by a charcoal canister or the like, the evaporating gas will be discharged into the air, which departs from the initial object of the hybrid vehicle to realize low pollution.

A possible approach to this problem is to force the canister to be heated by means of a heater or the like during the running operation to conduct a purge intentionally for the purpose of mixing the fuel vapor with the intake air to cause combustion. However, the value of the vehicle will be degraded if the EV allowed travel distance is reduced by the power consumption of the heater.

DISCLOSURE OF THE INVENTION

An object of the present invention is to provide a hybrid vehicle that can process fuel evaporating gas without reducing the EV allowed travel distance, a control method for the hybrid vehicle, a control program for the hybrid vehicle, and a recording medium recorded with the program.

The present invention is directed to a hybrid vehicle configured to allow charging from a source external to the vehicle, and includes a power storage device, a connector unit electrically connecting the power storage device with an external power supply, an absorption unit absorbing fuel vapor, and an activation unit activating the absorption unit to a state facilitating disengagement of fuel vapor during connection of the power storage device with the external power supply by the connector unit.

Preferably, the absorption unit includes a canister storing an adsorbent to which the fuel vapor adheres. The activation unit includes a heater receiving electric power from at least one of the battery and the external power supply to heat the canister. The hybrid vehicle further includes a purge mechanism to conduct a purge relative to the canister.

More preferably, the hybrid vehicle further includes a control device controlling the heater and purge mechanism. The control device determines the saturation level of the canister to operate the heater and purge mechanism when the saturation level is greater than a first value.

More preferably, the purge mechanism includes an internal combustion engine generating negative pressure. The hybrid vehicle further includes a control device controlling the heater and purge mechanism. The control device operates the heater in advance prior to starting the internal combustion engine when determination is made that starting the internal combustion engine is necessary at the next startup of the vehicle.

Further preferably, the hybrid vehicle further includes a time determination unit detecting or estimating the startup time of the vehicle. The control device operates the heater such that temperature increase is completed by the detected or estimated startup time.

According to another aspect, the invention is directed to a control method for a hybrid vehicle configured to allow charging from a source external to the vehicle. The hybrid vehicle includes a power storage device, a connector unit electrically connecting the power storage device with an external power supply, an absorption unit absorbing fuel vapor, an activation unit activating the absorption unit to a state facilitating disengagement of fuel vapor during connection of the power storage device with the external power supply by the connector unit, and a purge mechanism to cause disengagement of fuel vapor from the absorption unit. The control method includes the steps of charging the power storage device with electric power from the external power supply, operating the activation unit by the electric power supplied from the external power supply, and operating the purge mechanism following initiation of the operation of the activation unit.

According to a further aspect, the present invention is directed to a computer-readable recording medium recorded with a program to cause a computer to execute the control method for a hybrid vehicle set forth above.

According to still another aspect, the present invention is directed to a program to cause a computer to execute the control method for a hybrid vehicle set forth above.

The present invention provides the effect that the EV allowed travel distance is not reduced even if fuel evaporating gas is processed in an externally chargeable hybrid vehicle having a lower frequency of starting the engine.

BEST MODES FOR CARRYING OUT THE INVENTION

Figure 1:
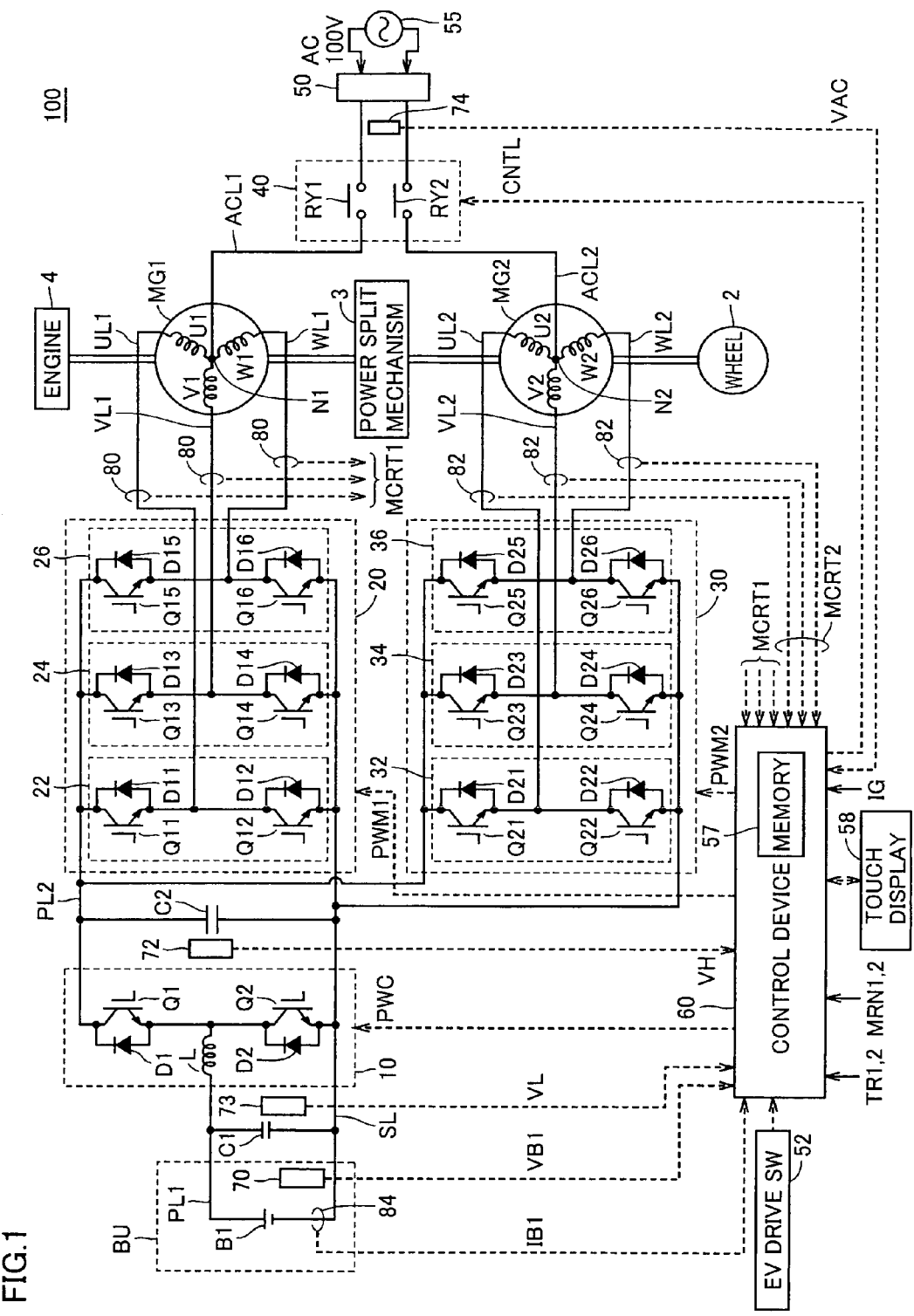
FIG. 1 is a schematic block diagram of a vehicle 100 according to an embodiment.

Embodiments of the present invention will be described hereinafter with reference to the drawings. In the drawings, the same or corresponding elements have the same reference characters allotted, and description thereof will not be repeated.

[Overall Configuration]

FIG. 1 is a schematic block diagram of a vehicle 100 according to an embodiment.

Referring to FIG. 1, vehicle 100 includes a battery unit BU, a boost converter 10, inverters 20 and 30, power supply lines PL1 and PL2, ground line SL, U-phase lines UL1 and UL2, V-phase lines VL1 and VL2, W-phase lines WL1 and WL2, motor generators MG1 and MG2, an engine 4, a power split mechanism 3, and a wheel 2.

Vehicle 100 is a hybrid vehicle using both a motor and an engine for driving the wheels.

Power split mechanism 3 is connected to engine 4 and motor generators MG1 and MG2 to split power therebetween. For example, a planetary gear mechanism including three rotational shafts of a sungear, a planetary carrier, and a ring gear can be employed for the power split mechanism. The three rotational shafts are connected to each rotational shaft of engine 4, motor generator MG1, and motor generator MG2, respectively. For example, engine 4 as well as motor generators MG1 and MG2 can be mechanically connected to power split mechanism 3 by passing the crank shaft of engine 4 through the center of the hollow rotor of motor generator MG1.

The rotational shaft of motor generator MG2 is coupled to wheel 2 by a reduction gear, a differential gear or the like not shown. Furthermore, a speed reducer relative to the rotational shaft of motor generator MG2 may be incorporated in power split mechanism 3.

Motor generator MG1 is incorporated in the hybrid vehicle to operate as a power generator driven by the engine and to operate as an electric motor that can start the engine. Motor generator MG2 is incorporated in the hybrid vehicle as an electric motor driving the driving wheels of the hybrid vehicle.

Motor generators MG1 and MG2 are, for example, three-phase AC synchronous electric motors. Motor generator MG1 includes the three-phase coil of a U-phase coil U1, a V-phase coil V1 and a W-phase coil W1 as the stator coil. Motor generator MG2 includes the three-phase coil of a U-phase coil U2, a V-phase coil V2 and a W-phase coil W2 as the stator coil.

Motor generator MG1 uses the engine output to generate three-phase AC voltage. The generated three-phase AC voltage is provided to inverter 20. Motor generator MG1 generates motive power by the three-phase AC voltage received from inverter 20 to start the engine.

Motor generator MG2 generates the drive torque for the vehicle by the three-phase AC voltage received from inverter 30. In addition, motor generator MG2 generates three-phase AC voltage for provision to inverter 30 during regenerative braking of the vehicle.

Battery unit BU includes a battery B1 that is a power storage device having a negative electrode connected to a ground line SL, a voltage sensor 70 measuring a voltage VB1 of battery B1, and a current sensor 84 measuring a current IB1 of battery B1. The vehicle load includes motor generators MG1 and MG2, inverters 20 and 30, and boost converter 10 supplying the boosted voltage to inverters 20 and 30.

For battery B1, a secondary battery such as a nickel metal hydride battery, a lithium ion battery, a lead battery, may be used. Alternatively, an electric double layer capacitor of large capacitance may be used instead of battery B1.

Battery unit BU provides the DC voltage output from battery B1 to boost converter 10. Battery B1 in battery unit BU is charged by the DC voltage output from boost converter 10.

Boost converter 10 includes a reactor L, npn transistors Q1 and Q2, and diodes D1 and D2. Reactor L has one end connected to power supply line PL1 and the other end connected to the connection node of npn transistors Q1 and Q2. Npn transistors Q1 and Q2 are connected in series between power supply line PL2 and ground line SL, and receive a signal PWC from control device 60 at their bases. Diodes D1 and D2 are connected between the collector and emitter of each of npn transistors Q1 and Q2 such that current flows from the emitter side to the collector side.

For the npn transistor set forth above and the npn transistor cited hereinafter in the present specification, an IGBT (Insulated Gate Bipolar Transistor), for example, can be employed. Alternatively, a power switching element such as a power MOSFET (Metal Oxide Semiconductor Field-Effect Transistor) may be employed instead of an npn transistor.

Inverter 20 includes a U-phase arm 22, a V-phase arm 24, and a W-phase arm 26. U-phase arm 22, V-phase arm 24, and W-phase arm 26 are connected in parallel between power supply line PL2 and ground line SL.

U-phase arm 22 includes npn transistors Q11 and Q12 connected in series. V-phase arm 24 includes npn transistors Q13 and Q14 connected in series. W-phase arm 26 includes npn transistors Q15 and Q16 connected in series. Diodes D11-D16 conducting a current flow from the emitter side to the collector side are connected between the collector and emitter of each of npn transistors Q11-Q16, respectively. The connection node of each npn transistors in each phase arm is connected to a coil end different from a neutral point N1 of each phase coil of motor generator MG1 via each of lines UL1, VL1 and WL1 of the U, V and W-phase.

Inverter 30 includes a U-phase arm 32, a V-phase arm 34 and W-phase arm 36. U-phase arm 32, V-phase arm 34 and W-phase arm 36 are connected in parallel between power supply line PL2 and ground line SL.

U-phase arm 32 includes npn transistors Q21 and Q22 connected in series. V-phase arm 34 includes npn transistors Q23 and Q24 connected in series. W-phase arm 36 includes npn transistors Q25 and Q26 connected in series. Diodes D21-D26 conducting a current flow from the emitter side to the collector side are connected between the collector and emitter of each of npn transistors Q21-Q26, respectively. Similarly in inverter 30, the connection node of each npn transistor in each phase arm is connected to the coil end each differing from a neutral point N2 of each phase coil of motor generator MG2 via each of phase lines UL2, VL2 and WL2 of the U, V and W-phase.

Vehicle 100 further includes capacitors C1 and C2, a relay circuit 40, a connector 50, a control device 60, AC lines ACL1 and ACL2, voltage sensors 72-74, and current sensors 80 and 82.

Capacitor C1 is connected between power supply line PL1 and ground line SL to reduce the influence caused by variation in voltage on battery B1 and boost converter 10. Voltage VL across power supply line PL1 and ground line SL is measured by voltage sensor 73.

Capacitor C2 is connected between power supply line PL2 and ground line SL to reduce the influence caused by variation in voltage on inverters 20 and 30 and boost converter 10. Voltage VH across power supply line PL2 and ground line SL is measured by voltage sensor 72.

Boost converter 10 boosts the DC voltage supplied from battery unit BU via power supply line PL1 and provides the boosted voltage onto power supply line PL2. Specifically, boost converter 10 responds to signal PWC from control device 60 to conduct a current flow according to the switching operation of npn transistor Q2. By that current, magnetic field energy is accumulated at reactor L. The current flow towards power supply line PL2 via diode D1 in synchronization with the OFF timing of npn transistor Q2 causes the accumulated energy to be output, whereby a boosting operation is effected.

Boost converter 10 responds to signal PWC from control device 60 to down-convert the DC voltage received from one or both of inverters 20 and 30 via power supply line PL2 to the voltage level of battery unit BU, and charges the battery in battery unit BU.

Inverter 20 responds to a signal PWM1 from control device 60 to convert the DC voltage supplied from power supply line PL2 into three-phase AC voltage to drive motor generator MG1.

Accordingly, motor generator MG1 is driven to generate the torque specified by a torque command value TR1. Inverter 20 converts the three-phase AC voltage generated by motor generator MG1 receiving the output from the engine to DC voltage based on signal PWM1 from control device 60, and provides the converted DC voltage to power supply line PL2.

Inverter 30 responds to a signal PWM2 from control device 60 to convert the DC voltage from power supply line PL2 to three-phase AC voltage to drive motor generator MG2.

Accordingly, motor generator MG2 is driven to generate the torques specified by a torque command value TR2. In a regenerative braking mode of the hybrid vehicle corresponding to vehicle 100, inverter 30 converts the three-phase AC voltage generated from motor generator MG2 that receives the rotary force from the driving shaft into DC voltage based on signal PWM2 from control device 60, and provides the converted DC voltage onto power supply line PL2.

As used herein, regenerative braking includes braking which is caused when the driver of the hybrid vehicle operates the foot brake and which is accompanied by regenerative power generation as well as deceleration (or stopping of acceleration) of the vehicle by releasing the accelerator pedal during driving without operating the foot brake while effecting regenerative power generation.

Relay circuit 40 includes relays RY1 and RY2. For relays RY1 and RY2, a mechanical contact relay, for example, can be employed. Alternatively, a semiconductor relay may be used. Relay RY1 is disposed between AC line ACL1 and connector 50, and is turned ON/OFF in response to control signal CNTL from control device 60. Relay RY2 is disposed between AC line ACL2 and connector 50, and is turned ON/OFF in response to control signal CNTL from control device 60.

Relay circuit 40 connects/detaches AC lines ACL1 and ACL2 with respect to connector 50 according to control signal CNTL from control device 60. Specifically, relay circuit 40 electrically connects ACL lines ACL1 and ACL2 with connector 50 upon receiving control signal CNTL of an H (logical high) level from control device 60, and electrically disconnects AC lines ACL1 and ACL2 from connector 50 upon receiving control signal CNTL of an L (logical low) level from control device 60.

Connector 50 is a terminal to enter AC voltage from an external commercial power supply 55 between neutral points N1 and N2 of motor generators MG1 and MG2. As this AC voltage, AC 100V can be applied from the domestic commercial power supply line, for example. The voltage applied to connector 50 is measured by voltage sensor 74. The measured value is transmitted to control device 60.

Voltage sensor 70 detects battery voltage VB1 of battery B1. The detected battery voltage VB1 is provided to control device 60. Voltage sensor 73 detects the voltage across capacitor C1, i.e. input voltage VL of boost converter 10. The detected voltage VL is provided to control device 60. Voltage sensor 72 detects the voltage across capacitor C2, i.e. the output voltage VH of boost converter 10 (corresponding to the input voltage of inverters 20 and 30; the same applies hereinafter). The detected voltage VH is provided to control device 60.

Current sensor 80 detects a motor current MCRT1 flowing through motor generator MG1. The detected motor current MCRT1 is provided to control device 60. Current sensor 82 detects motor current MCRT2 flowing through motor generator MG2. The detected motor current MCRT2 is provided to control device 60.

Control device 60 generates a signal PWC directed to driving boost converter 10, based on torque command values TR1 and TR2 and motor revolution speeds MRN1 and MRN2 of motor generators MG1 and MG2 output from an externally provided ECU (Electronic Control Unit), voltage VL from voltage sensor 73, and voltage VH from voltage sensor 72. The generated signal PWC is provided to boost converter 10.

Control device 60 also generates a signal PWM1 directed to driving motor generator MG1 based on voltage VH as well as motor current MCRT1 and torque command value TR1 of motor generator MG1. The generated signal PWM1 is provided to inverter 20. Additionally, control device 60 generates a signal PWM2 directed to driving motor generator MG2, based on voltage VH as well as motor current MCRT2 and torque command value TR2 of motor generator MG2. The generated PWM2 signal is provided to inverter 30.

Control device 60 generates signals PWM1 and PWM2 to control inverters 20 and 30 such that battery B1 is charged by the AC voltage of the commercial power supply applied between neutral points N1 and N2 of motor generators MG1 and MG2, based on a signal IG from the ignition switch (or ignition key) and the state of charge SOC of battery B1.

Control device 60 also determines whether charging from an external source is allowed or not based on the state of charge SOC of battery B1. When determination is made that charging is allowed, control signal CNTL of an H level is provided to relay circuit 40. When control device 60 determines that battery B1 is in a substantially fully-charged state and charging is not allowed, control signal CNTL of an L level is provided to relay circuit 40. Inverters 20 and 30 are stopped when signal IG indicates an inactive state.

Vehicle 100 further includes an EV drive switch 52. EV drive switch 52 is directed to setting an EV drive mode. An EV drive mode allows traveling only by the motor, reducing the operation of the engine, for the purpose of reducing noise in residential areas late at night and early in the morning as well as exhaust gas at in-door parking lots and garages.

The EV drive mode is automatically canceled when EV drive switch 52 is set to an OFF state, or when the state of charge of the battery is below a predetermined value, the car speed exceeds a predetermined level, or the accelerator pedal position exceeds a defined value.

In the case where the electric power obtained by charging from an external commercial power supply 55 is to be used intentionally, the operation mode of the vehicle is set to be switched from a normal HV mode to an EV drive mode by EV drive switch 52.

Vehicle 100 further includes a touch display 58 that displays the status of the vehicle and that functions as an input device for a car navigation system or the like.

A memory 57 that allows data reading and writing is incorporated in control device 60. Control device 60 may be implemented by a plurality of computers such as an electric power steering computer, hybrid control computer, parking assist computer, and the like.

[Charging from Source External to Vehicle]

The method of generating direct current charge voltage from alternating voltage VAC of commercial power supply 55 in vehicle 100 will be described hereinafter.

In the case of charging from a source external to the vehicle, control device 60 turns npn transistors Q11-Q16 (or Q21-Q26) ON/OFF such that AC current of the same phase is conducted to U-phase arm 22 (or 32), V-phase arm 24 (or 34) and W-phase arm 26 (or 36) of inverter 20 (or 30).

In the case where AC current of the same phase flows to the coil of each U, V and W-phase, rotary torque is not generated at motor generators MG1 and MG2. Alternating voltage VAC is converted into direct current charge voltage by cooperative control of inverters 20 and 30.

Figure 2:
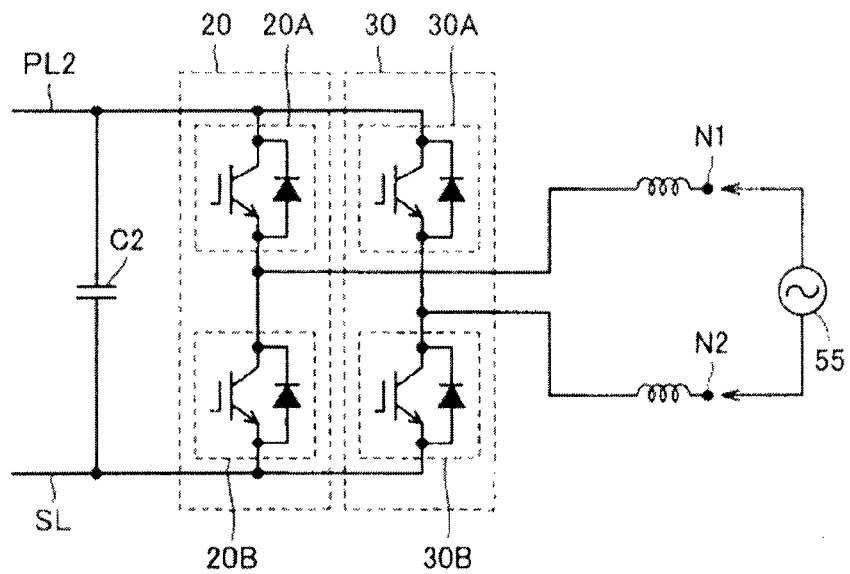
FIG. 2 is a circuit diagram of an equivalent circuit of inverters 20, 30 and motor generators MG1, MG2 of FIG. 1.

FIG. 2 is a circuit diagram of an equivalent circuit of inverters 20 and 30 and motor generators MG1 and MG2 of FIG. 1.

In FIG. 2, npn transistors Q11, Q13, and Q15 of inverter 20 are generically indicated as an upper arm 20A, whereas npn transistors Q12, Q14 and Q16 of inverter 20 are generically indicated as a lower arm 20B. Similarly, npn transistors Q21, Q23 and Q25 of inverter 30 are generically indicated as an upper arm 30A, whereas npn transistors Q22, Q24 and Q26 of inverter 30 are generically indicated as a lower arm 30B.

As shown in FIG. 2, this equivalent circuit can be taken as a single-phase PWM converter based on the input of single-phase commercial power supply 55 electrically connected to neutral points N1 and N2 via relay circuit 40 and connector 50 of FIG. 1. By switching-control such that inverters 20 and 30 operate as each phase arm of each single-phase PWM converter, the single-phase AC power from commercial power supply 55 is converted into DC power, which is supplied onto power supply line PL2.

Control device 60 described with reference to FIGS. 1-2 may be implemented, not only by hardware, but also by software using a computer.

Figure 3:
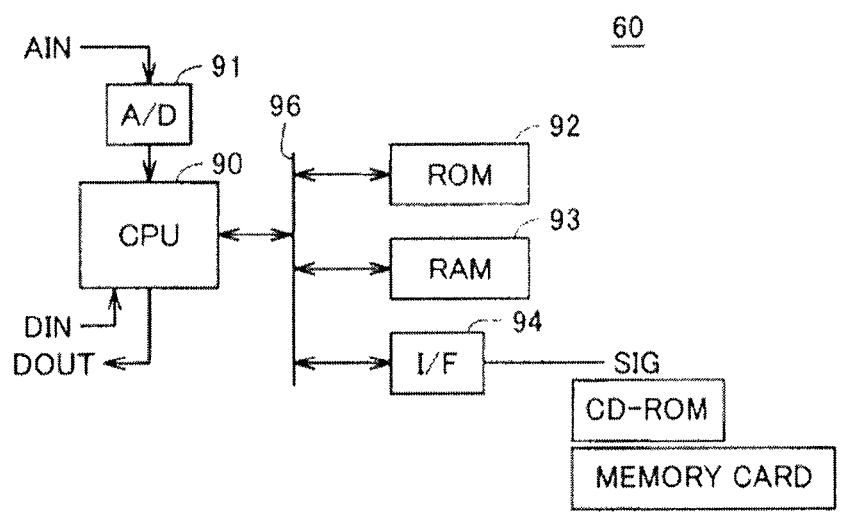
FIG. 3 represents a general configuration corresponding to the case where a computer is employed as a control device 60.

FIG. 3 represents a general configuration corresponding to the case where a computer is employed as control device 60.

Referring to FIG. 3, a computer qualified as control device 60 includes a CPU 90, an A/D converter 91, a ROM 92, a RAM 93, and an interface unit 94.

A/D converter 91 converts an analog signal AIN output from respective sensors into a digital signal for output to CPU 90. CPU 90 is connected to ROM 92, RAM 93 and interface unit 94 via a bus 96 that is a data bus or address bus to receive and transmit data.

The program executed at CPU 90 and data such as a map to be referred to, for example, are stored in ROM 92. RAM 93 is a work region for CPU 90 to execute data processing, for example, and temporarily stores various variables.

Interface unit 94 establishes communication with another ECU, inputs rewrite data in the case where an electrically writable flash memory or the like is employed as ROM 92, and/or reads in a data signal SIG from a computer-readable recording medium such as a memory card or CD-ROM.

CPU 90 transmits or receives a data input signal DIN and/or a data output signal DOUT through an input/output port.

The configuration of control device 60 is not limited to that set forth above, and may be realized including a plurality of CPUs.

[Control During Charging]

Figure 4:
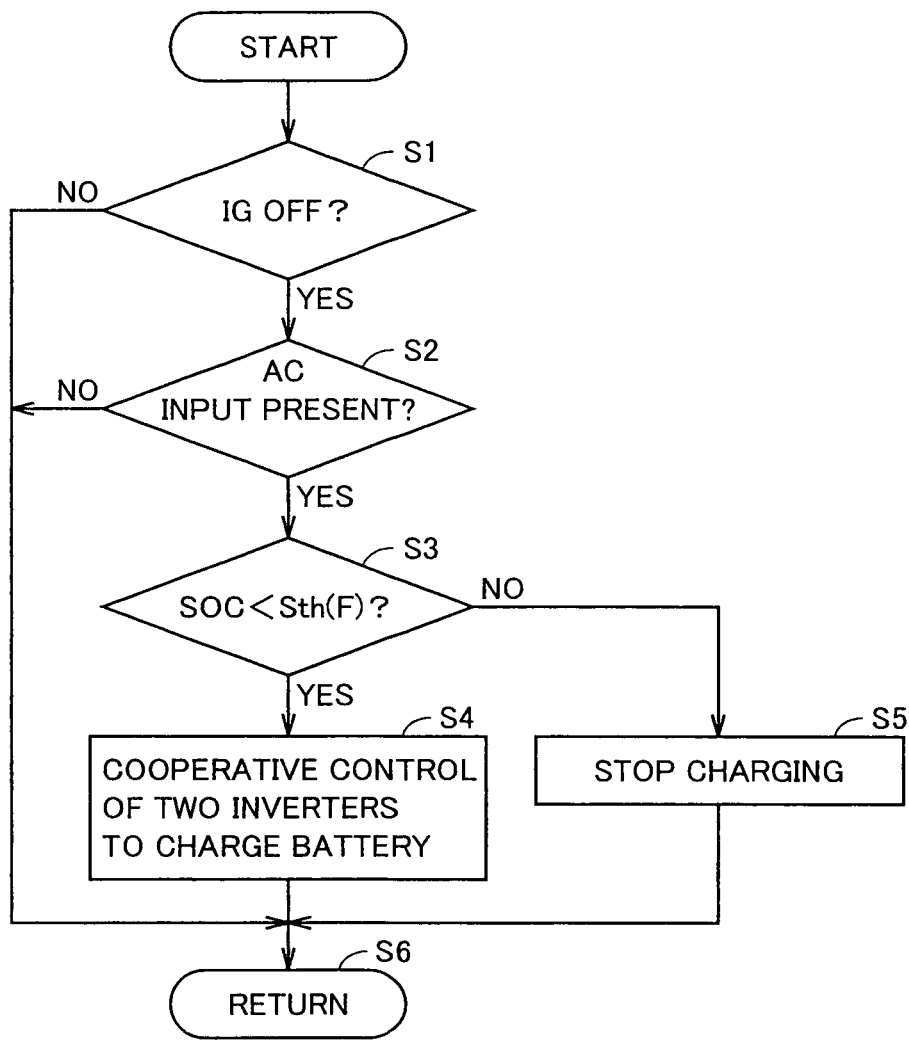
FIG. 4 is a flowchart of a control configuration of a program in association with determining initiation of charging by control device 60 of FIG. 1.

FIG. 4 is a flowchart of a control configuration of a program in association with determination of initiating charging by control device 60 of FIG. 1. The process of this flowchart is invoked from the main routine to be executed at a constant time interval or every time a predetermined condition is satisfied.

Referring to FIG. 4, control device 60 determines whether the ignition key is set at the OFF position based on signal IG from the ignition key (step S1). When determination is made that the ignition key is not set at the OFF state (NO at step S1), control device 60 determines that it is improper to connect commercial power supply 55 with connector 50 to charge battery B1, and proceeds to step S6 where control returns to the main routine.

When determination is made that the ignition key set at the OFF state at step S1 (YES at step S1), control device 60 determines whether the flag for charging is connected and the AC power from commercial power supply 55 is applied to connector 50, based on voltage VAC from voltage sensor 74 (step S2). When voltage VAC is not observed, control device 60 determines that AC power is not applied to connector 50 (NO at step S2), and proceeds to step S6 where control returns to the main routine.

In contrast, in the case where voltage VAC is detected, control device 60 determines that AC power is applied to connector 50 from commercial power supply 55 (YES at step S2). Then, control device 60 determines whether the SOC of battery B1 is lower than a threshold value Sth(F) (step S3). As used herein, threshold value Sth(F) is used to determine whether the SOC of battery B1 is sufficient or not.

When control device 60 determines that the SOC of battery B1 is lower than threshold value Sth(F) (YES at step S3), an input enable signal EN to be provided to relay circuit 40 is rendered active. Then, control device 60 controls the switching of two inverters 20 and 30, each regarded as a phase arm of a single-phase PWM converter, while operating each phase arm of each of two inverters 20 and 30 under the same switching state to execute charging of battery B1 (step S4). Then, control proceeds to step S6 to return to the main routine.

When determination is made that the SOC of battery B1 is at least threshold value Sth(F) at step S3 (NO at step S3), control device 60 determines that charging of battery B1 is not necessary, and executes the charge suspension process (step S5). Specifically, control device 60 stops inverters 20 and 30, and renders inactive input enable signal EN output to relay circuit 40. Then, control proceeds to step S6 to return to the main routine.

[Description Related to Fuel Consumption]

A hybrid vehicle that can be charged from an external source was described above. In such a hybrid vehicle that allows charging from an external source, it is expected that the event of the engine being started will be reduced since the region of electric vehicle travel (EV travel) expands. Thus there is a problem that a purge cannot be conducted since the engine is not started even though the possibility of requiring a purge is high due to a large amount of fuel vapor adhering to the canister in the case where the temperature is high such as during the summer time or immediately after fuel supply. First, the configuration of supplying fuel to the internal combustion engine of the hybrid vehicle will be described.

Figure 5:
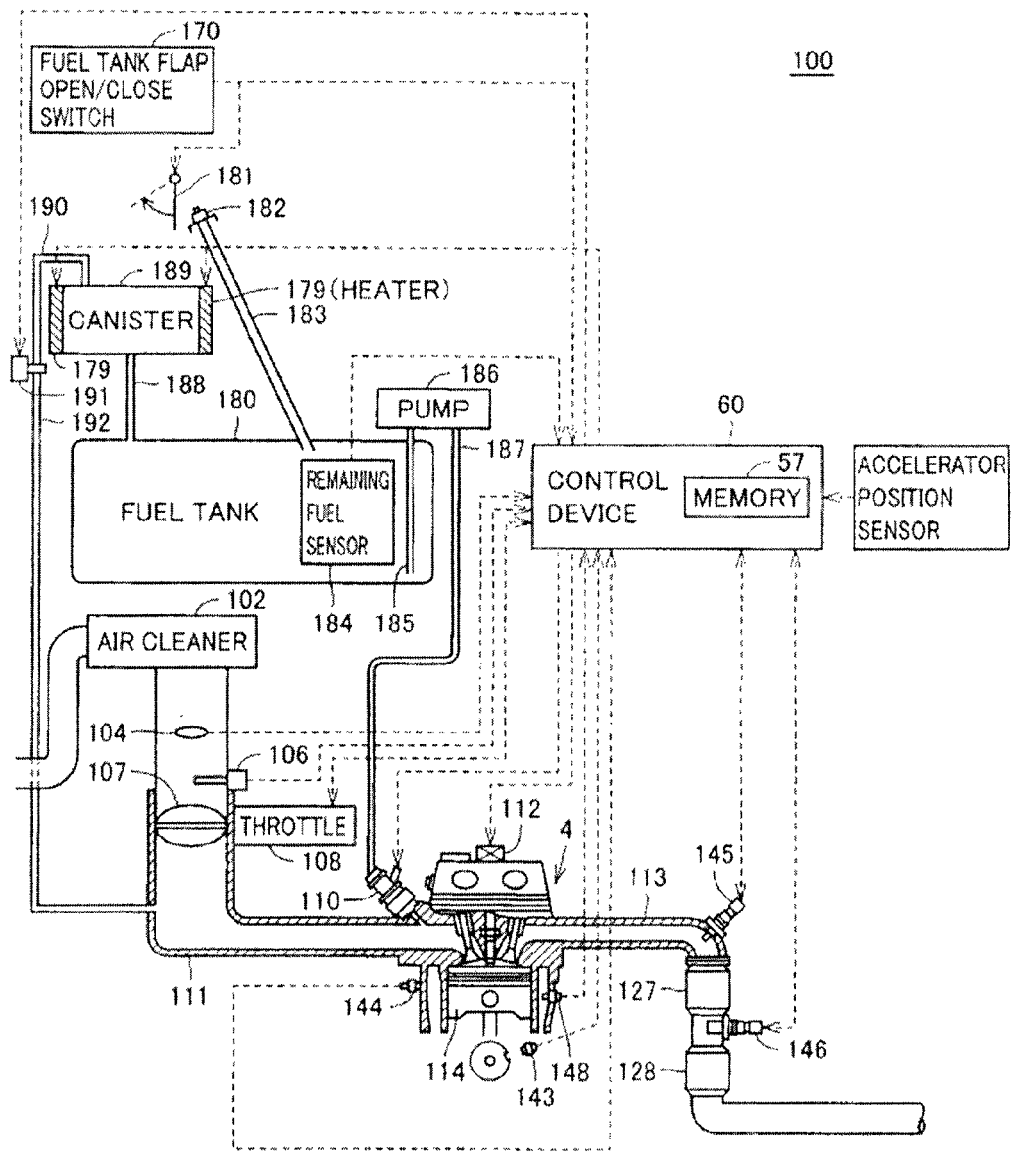
FIG. 5 is a schematic diagram to describe the neighborhood of an engine 4 of vehicle 100.

FIG. 5 is a schematic diagram to describe the neighborhood of engine 4 of vehicle 100.

Referring to FIG. 5, engine 4 includes an intake pipe 111 to introduce air into the cylinder head, and an exhaust pipe 113 for exhaust from the cylinder head.

An air cleaner 102, an air flow meter 104, an intake temperature sensor 106, and a throttle valve 107 are provided in the cited order upstream of intake pipe 111. Throttle valve 107 has its opening controlled by an electronic control throttle 108. An injector 110 to inject fuel is disposed close to the intake valve of intake pipe 111.

At exhaust pipe 113, an air-fuel ratio sensor 145, a catalyst device 127, an oxygen sensor 146, and a catalyst device 128 are disposed in the cited order from the exhaust valve side. Engine 4 further includes a piston 114 that moves a cylinder up and down provided at a cylinder block, a crank position sensor 143 sensing the rotation of a crankshaft that rotates according to the vertical movement of piston 114, a knock sensor 144 sensing vibration at the cylinder block to detect occurrence of knocking, and a coolant temperature sensor 148 attached to the coolant path of the cylinder block.

Control device 60 alters the intake amount by adjusting electronic control throttle 108 according to the output from accelerator position sensor 150, and outputs an ignition instruction to ignition coil 112 according to the crank angle obtained from crank position sensor 143 to provide the fuel injection time to injector 110. Control device 60 also corrects the amount of fuel injection, the amount of air, and the ignition timing according to the outputs from intake temperature sensor 106, knock sensor 144, air-fuel ratio sensor 145, and oxygen sensor 146.

Vehicle 100 further includes a fuel tank 180, a fuel pump 186, a remaining fuel sensor 184, a canister 189, and a canister purge VSV (vacuum switching valve) 191. The fuel drawn by fuel pump 186 via a channel 185 is pressurized to be output to a channel 187. When injector 110 opens at a predetermined timing, the fuel is injected into intake pipe 111.

The fuel vapor evaporated in fuel tank 180 is pushed out from fuel tank 180 when its volume is increased by the high temperature or when fuel is introduced. The fuel vapor passes through channel 188 to adhere to the activated charcoal in canister 189. The absorbed fuel vapor passes through channels 190 and 192 to be output to intake pipe 111 in response to canister purge VSV 191 being opened by control device 60. Canister purge VSV 191 can alter the flow rate of the fuel vapor according to the duty ratio of a control signal applied from control device 60.

In response to the operation of a fuel tank flap open/close switch 170 by the driver, a lid 181 opens to allow a fuel cap 182 to be removed. Fuel is supplied from a fuel supply apparatus such as the gasoline station or the like to a fuel supply channel 183.

[Purge of Fuel Vapor Trapped at Canister]

If dense fuel vapor is discharged into intake pipe 111 via channels 190 and 192, the general fuel injection amount determined by the degree of pressing down the accelerator pedal will be of a level too high for the actual fuel injection amount.

When detection is made that the air-fuel mixture is rich by air-fuel ratio sensor 145, control device 60 reduces the amount of fuel injection until air-fuel ratio sensor 145 indicates the desired air-fuel ratio. In the case where the purge of the canister proceeds under the state where the fuel injection amount is reduced and the fuel vapor component becomes gradually thin, air-fuel ratio sensor 145 will detect a lean state of the air-fuel mixture. In response, control device 60 increases the fuel injection amount until air-fuel ratio sensor 145 indicates the desired air-fuel ratio. Thus, feedback-control of the fuel injection amount is effected by air-fuel ratio sensor 145 and control device 60.

In the case where the fuel injection amount under feedback-control is lower than the general fuel injection amount, control device 60 recognizes that the canister has a large amount of fuel vapor absorbed and fuel vapor is introduced into intake pipe 111. In other words, control device 60 can determine whether a purge is required at the canister, i.e. whether the saturation level of the canister is higher than a standard value, according to the controlled amount of fuel injection.

Namely, the hybrid vehicle includes a control device 60 that controls heater 179 and an engine to conduct a purge by generating negative pressure. Control device 60 determines the saturation level of canister 189 to cause heating through heater 179 when the saturation level is higher than a first value, and then operates the engine.

Figure 6:
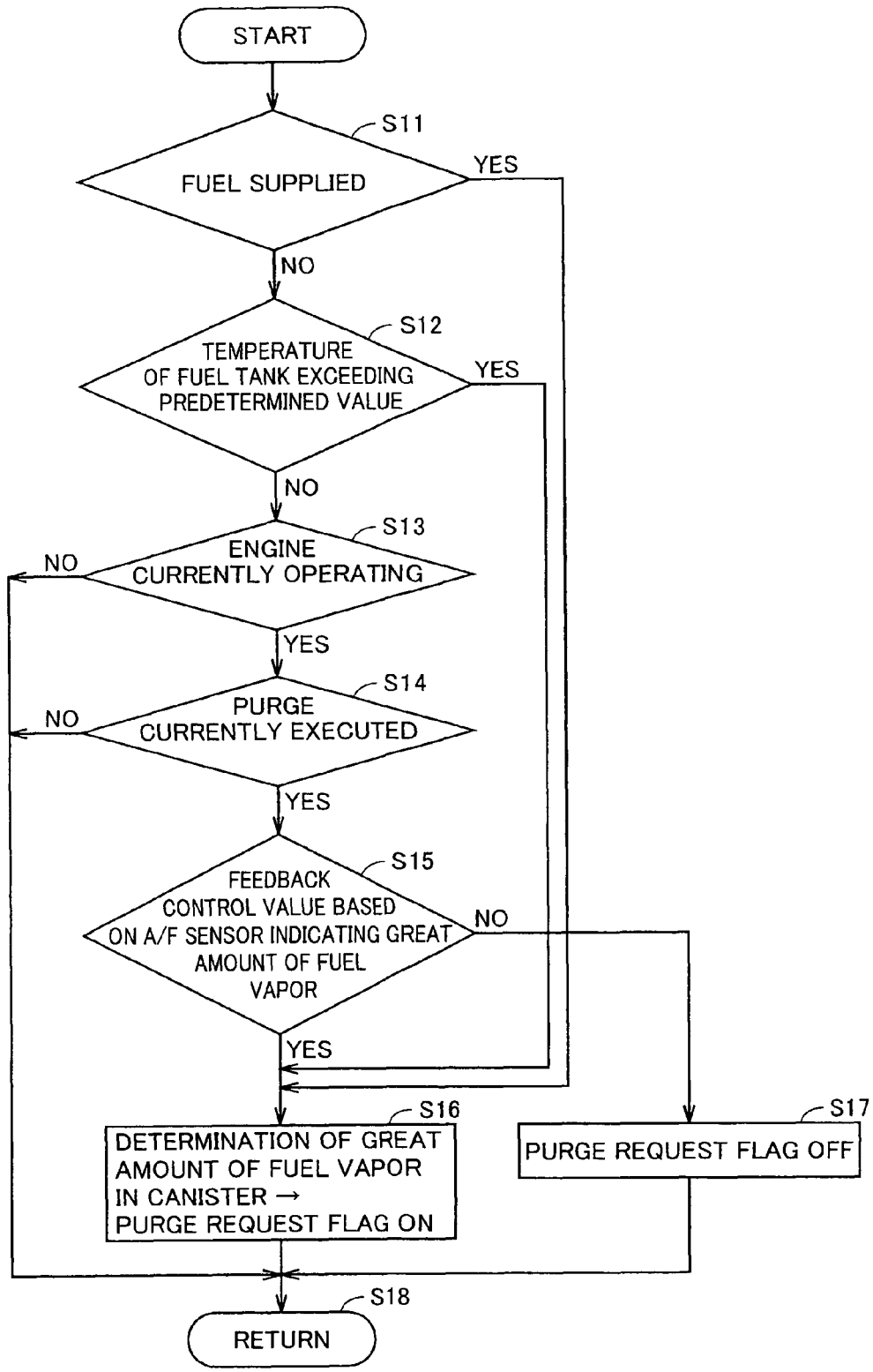
FIG. 6 is a flowchart to describe ON/OFF control of a purge request flag by control device 60.

FIG. 6 is a flowchart to describe the ON/OFF control of a purge request flag by control device 60. The process of this flowchart is invoked from a predetermined main routine to be executed at a constant time interval or every time a predetermined condition is established.

Referring to FIGS. 5 and 6, upon initiation of the process, control device 60 determines whether fuel has been supplied or not at step S11.

When fuel is supplied, the pressure in the fuel tank increases to cause the fuel vapor to flow towards the canister. Accordingly, the canister absorbs the fuel vapor. Thus, the purge of the canister is required.

Determination is made that fuel has been supplied in the case where the detected result from remaining fuel sensor 184 indicates fuel increase, or when the needle of the fuel gauge that moves correspondingly is shifted in the increasing direction.

When determination is made that fuel has not been supplied at step S11, control proceeds to step S12 where control device 60 determines whether the temperature at the fuel tank has exceeded a predetermined value.

Determination is made that a purge of the canister is required when the temperature at the fuel tank is high since it is possible that the concentration of the fuel vapor is high reflecting the high temperature, and is flowing into the canister by the volume expansion.

For example, the raised temperature in the proximity of the fuel tank may be estimated from the engine load or the like. Alternatively, a temperature sensor may be provided at the fuel tank to detect the temperature thereof. Further, a temperature sensor for detecting the ambient temperature may be provided to estimate the temperature based on the assumption that the fuel tank temperature reflects the ambient temperature.

When determination is made that the fuel tank temperature has not exceeded a predetermined value at step S12, control proceeds to step S13 to determine whether engine 4 is currently operating or not. When determination is made that engine 4 is currently operating at step S13, control proceeds to step S14 to determine whether a purge of canister 189 is currently carried out.

When the engine is in an inactive state at step S13, or when not currently purging at step S14, control proceeds to step S18 without the purge request flag being altered. Then, control returns to the main routine.

When determination is made that a purge of canister 189 is currently executed at step S14, control proceeds to step S15.

At step S15, control device 60 determines whether the feedback control value of the fuel injection amount based on the usage of air-fuel ratio sensor 145 during the purging operation indicates that the amount of fuel vapor introduced during intake is great or not. In other words, when the fuel injection amount is regulated to be lower than the general fuel injection amount that is determined based on the stepping amount of the accelerator pedal by at least a predetermined amount, determination is made that a purge of the canister is further required since the concentration of fuel vapor is high.

Control proceeds to step S16 when determination is made that fuel was supplied at step S11, the fuel tank temperature exceeds a predetermined value at step S12, and the feedback control value indicates a large amount of fuel vapor at step S15.

At step S16, determination is made that the fuel vapor trapped amount in the canister is great and a purge is still required at step S16. In response, control device 60 sets the purge request flag to an ON state. The purge request flag is stored in a non-volatile manner in memory 57 in control device 60 of FIG. 5, and retained as indicating the state of the canister even after the vehicle drive ends.

In the case where the feedback control value does not indicate a great fuel vapor amount at step S15, control proceeds to step S17 where control device 60 sets the purge request flag to an OFF state. In this case, determination is made that a purge is not necessary since the concentration of the fuel vapor delivered from the canister is thin enough.

When the process of step S16 or S17 ends, control proceeds to step S18 to return to the main routine.

Figure 7:
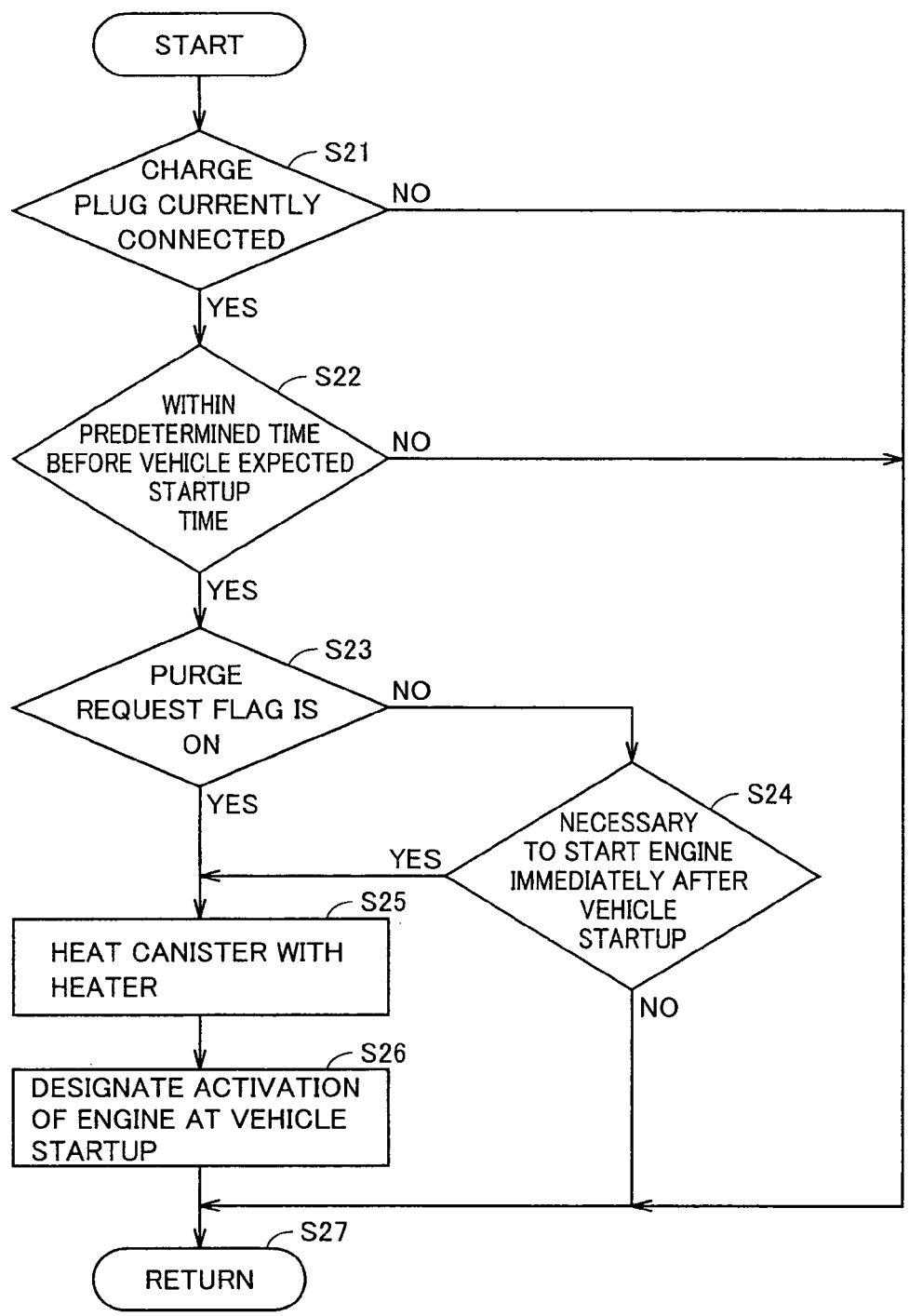
FIG. 7 is a flow chart to describe control for heating the canister by a heater during charging from an external source.

FIG. 7 is a flowchart to describe the control of heating the canister by means of a heater during charging from an external source. The process of this flowchart is invoked from a predetermined main routine to be executed at a predetermined time interval or every time a predetermined condition is established.

Heating canister 189 of FIG. 5 with heater 179 facilitates the disengagement of the fuel vapor from the activated charcoal in the canister during the purge mode. However, the power loss is great if heating is continuously conducted by the heater during charging. Since a purge cannot be conducted unless the engine is operated subsequent to startup of the vehicle, it is preferable to effect heating by the heater immediately before the time to start operation of the engine. However, this heating by the heater will consume the power stored in the battery, if the vehicle is not connected to an external power supply, resulting in a shorter EV allowed travel distance.

If the canister is preheated with the heater immediately before startup of the vehicle under a state where the driver attaches the charge plug to the connector of the vehicle to allow power feeding from an external source, a purge can be conducted in a state where the canister is heated. This provides the advantage that a purge can be completed in a short period of time, allowing reduction in the engine operating time.

Upon initiation of the process shown in FIG. 7, control device 60 determines whether the charge plug is connected to connector 50 of FIG. 1 at step S21. This determination of plug connection may be made by detecting a voltage at voltage sensor 74, or by providing a sensor that detects the physical contact of a plug with a connector.

When determination is made that the charge plug is currently connected with connector 50 of the vehicle at step S21, control proceeds to step S22 where determination is made as to whether the period of time before the expected startup time is within a predetermined time or not. This expected startup time of the vehicle may be preset by the driver using a one-week schedule timer incorporated in the control device or the like. Alternatively, the user may store the time the vehicle is started every morning in a memory incorporated in the control device to have the expected startup time of the vehicle determined based on the time stored in the memory. The predetermined time is set to a period of time required for the canister to be raised to an appropriate temperature by the heater.

When determination is made that the time before the expected startup time of the vehicle is within the predetermined time at step S22, control proceeds to step S23 where control device 60 determines whether the purge request flag determined by the process of the flowchart in FIG. 6 and stored in memory 57 is ON or not.

In the case where determination is made that the purge request flag is ON at step S23, control proceeds to step S25. In the case where the purge request flag is OFF, control proceeds to step S24.

At step S24, determination is made whether the engine has to be started immediately after startup of the vehicle. For example, there is a possibility of engine trouble such as run out of lubrication oil at respective components if the engine is not operated for a long period of time. Another possible case is where the temperature is low so that the engine has to be operated to effect warm up. There may also be the case where the engine must be operated to conduct the function check (OBD (On Board Diagnosis) rate monitor request) of the catalyst and the like that is to be carried out periodically under the law in the United States and the like.

Thus, there may be the case where the engine has to be started at a constant time interval even if the state of charge of the battery corresponds to the state where engine operation is not required. It is to be noted that the opportunity of operating the engine may become extremely low for an externally chargeable hybrid vehicle. It is therefore desirable to conduct a purge of the canister, if only a little, as long as there is an opportunity to start the engine, irrespective of an OFF state of the purge request flag.

When determination is made that starting the engine is necessary at step S24, control proceeds to step S25.

At step S25, control device 60 heats canister 189 by means of heater 179 of FIG. 5. This facilitates the disengagement of the fuel vapor from canister 189. At step S26, control device 60 activates engine 4 at the startup of the vehicle to execute a purge of canister 189. Between step S25 and step S26, the driver detaches the charge plug from connector 50 of the vehicle, and applies a vehicle startup designation at step S26 to the vehicle by means of a start key and the like. The heating of canister 189 through heater 179 may be continued even during execution of a purge at step S26. In this case, the heating by heater 179 will not directly cause reduction in the EV allowed travel distance since engine 4 is operated and electric power can be generated by motor generator MG1.

In the case where the condition of any of steps S21, S22 and S24 is not established, or when the process of step S26 ends, control proceeds to step S27 to return to the main routine.

As appreciated from FIGS. 4 and 7, the control method of the present embodiment includes step S4 to charge battery B1 with electric power from an external power supply, step S25 to operate the heater in order to activate the canister by the electric power applied from an external power supply, and step S26 to operate engine 4 for a purge following initiation of the heater operation.

The present embodiment will be briefly recapitulated referring to FIGS. 1 and 5 again in view of the description set forth above. A hybrid vehicle 100 configured to allow charging from a source external to the vehicle includes a battery B1 that is a power storage device, a connector 50 electrically coupling the power storage device with an external commercial power supply 55, an absorption unit absorbing fuel vapor, and an activation unit activating the absorption unit to facilitate disengagement of fuel vapor during connection of the power storage device with the external power supply through a connector 50.

Preferably, the absorption unit includes a canister 189 storing an adsorbent (activated charcoal or the like) to which fuel vapor adheres. The activation unit includes a heater 179 receiving electric power from at least one of the battery and external power supply to heat canister 189. The hybrid vehicle further includes a purge mechanism conducting a purge relative to canister 189.

More preferably, the hybrid vehicle further includes a control device 60 controlling heater 179 and the purge mechanism. Control device 60 determines the saturation level of canister 189, and operates heater 179 and the purge mechanism when the saturation level is larger than a first value.

More preferably, the purge mechanism includes an engine 4 that generates negative pressure. The hybrid vehicle further includes a control device 60 controlling heater 179 and the purge mechanism. Control device 60 operates heater 179 in advance prior to starting engine 4 when determination is made that starting engine 4 is necessary at the next startup of the vehicle.

[Modification]

The present modification is directed to transmitting a previous notice signal of vehicle startup, when charging is conducted at home or the like, in response to the front door of the residence being locked from outside. The previous notice signal is transmitted from the residence to the vehicle by power transmission line communication through a charge cable.

Figure 8:
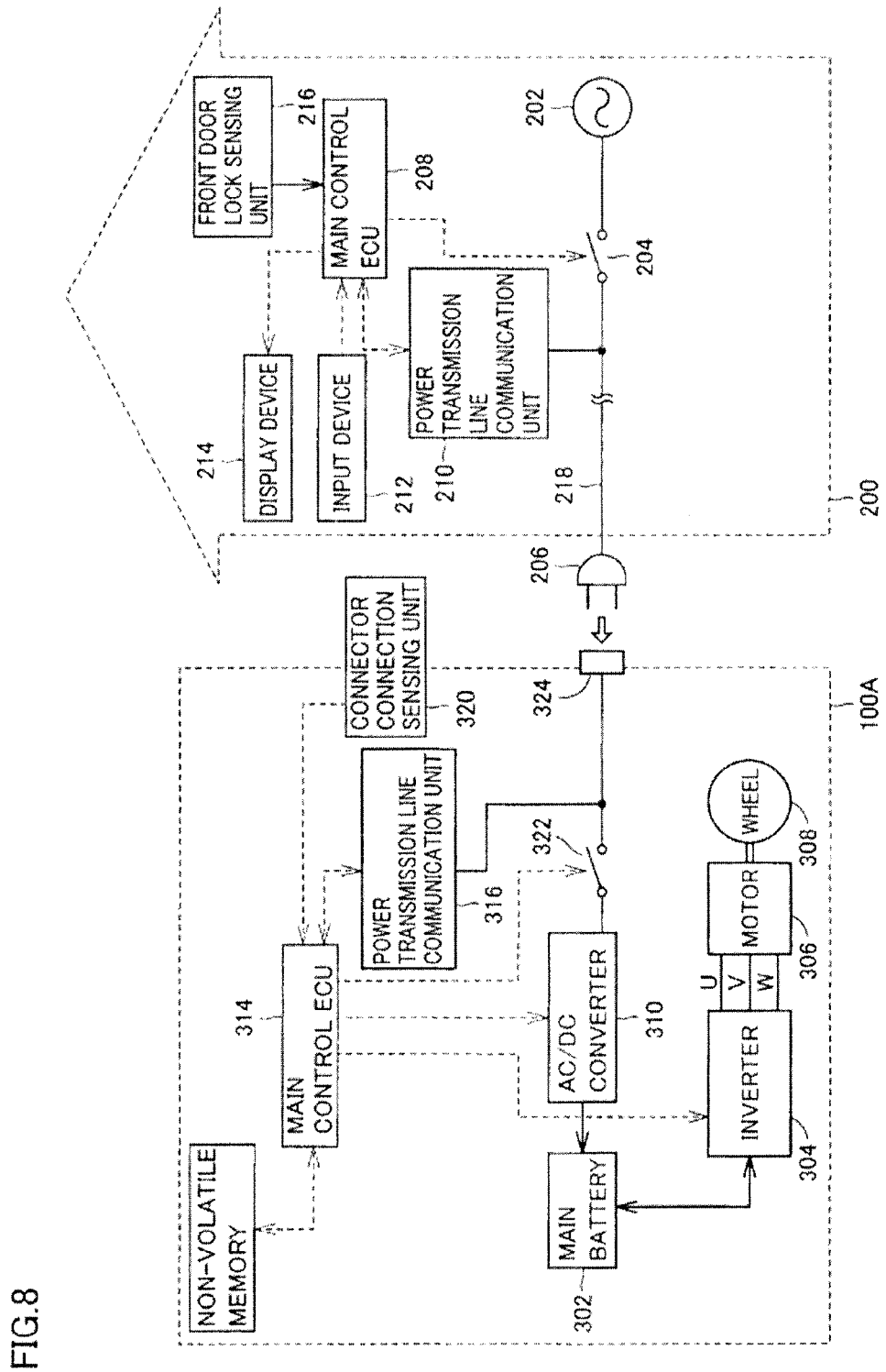
FIG. 8 is a block diagram of a configuration of a vehicle and a charger system according to a modification.

FIG. 8 is a block diagram of a configuration of a vehicle and a charger system according to the modification.

Referring to FIG. 8, a vehicle 100A includes a wheel 308, a motor 306 driving wheel 308, an inverter 304 supplying three-phase AC voltage to motor 306, a main battery 302 applying DC power to inverter 304, and a main control ECU 314 to control inverter 304. Vehicle 100A is a hybrid vehicle that uses the motor and engine for driving. The configuration of elements in association with the engine is similar to that described with reference to FIG. 5. Therefore, description thereof will not be repeated and not shown in FIG. 8.

For main battery 302, a secondary battery such as a nickel metal hydride battery, a lithium ion battery, a lead battery, or a capacitor of large capacitance directed to power storage may be used.

Vehicle 100A is configured to allow charging from an external source towards main battery 302. Vehicle 100A further includes a connector 324 provided with a terminal to externally apply commercial power supply such as AC 100V, for example, an AC/DC converter 310 converting the AC power applied to connector 324 into DC power, which is applied to main battery 302, a switch 322 for connecting connector 324 with AC/DC converter 310, a connector connection sensing unit 320 sensing that charge plug 206 of charger system 200 has been connected to connector 324, and power transmission line communication unit 316.

Main control ECU 314 monitors the state of charge SOC of main battery 302, and senses connector connection by connector connection sensing unit 320. When charge plug 206 is connected to connector 324, main control ECU 314 conducts communication with the part of charger system 200 using power transmission line communication unit 316 to confirm that there is no error such as disconnection or shorting at the power transmission path. Establishment of such communication allows the confirmation of no error.

At vehicle 100A, the power transmission path starts from connector 324 to main battery 302 via switch 322 and AC/DC converter 310. In the power transmission path from connector 324 to AC/DC converter 310, electric power is transferred at a first current value of high energy at AC 100V, for example. From AC/DC converter 310 to main battery 302, electric power is transferred at a current value of high energy, which has been converted to direct current.

In contrast, power transmission line communication unit 116 conducts communication at a second current value lower than the first current value directed to feeding power in the power transmission line path set forth above.

In terms of frequency, power reception and transmission is effected with an AC signal of 50 Hz or 60 Hz in frequency, for example, in Japan. Communication is effected at a slightly higher or lower frequency thereof. Although the frequency depends upon each country, the setting is made such that electric power transmission and reception is effected with alternating current in the range of 15 to 150 Hz in frequency, and the communication signal has a frequency outside the frequency range of 15 to 150 Hz.

Main control ECU 314 controls power transmission line communication unit 316 and the power transmission path. Main control ECU 314 first effects communication as to whether power reception/transmission is to be carried out or not with charger system 200 by means of power transmission line communication unit 316. When the communication result indicates agreement of power transmission/reception, electric power is transmitted and received between main battery 302 and charger system 200 through the power transmission path.

Charger system 200 includes an AC power supply 202 to feed power for charging main battery 302. Commercial power supply AC 100V, for example, can be employed for AC power supply 202.

Charger system 200 further includes a charge plug 206, a charge cable 218, a switch 204 to connect AC power supply 202 with the power transmission path of vehicle 100 via charge cable 218, and a main control ECU 208 directed to power supply control, effecting communication with power transmission line communication unit 116 to control switch 204. Main control ECU 208 can conduct communication with power transmission line communication unit 316 using power transmission line communication unit 210. Main control ECU 314 of the vehicle instructs main control ECU 208 to open/close switch 204 via power transmission line communication unit 316.

At charger system 200, the current of the first and second current values (AC 100V and high frequency signal for communication) is transmitted through charge cable 218. Charge plug 206 is provided at the end of the cable.

Vehicle 100A further includes a connector 324 serving as a connection unit to connect charge plug 206. Main control ECU 314 of vehicle 100A changes switch 322 from an open state to a connected state, when the state of charge SOC of main battery 302 is lower than a predetermined value, issues a power feed request to charger system 200, and operates AC/DC converter 310 for charging main battery 302.

When a power feed request is issued from the part of vehicle 100A to the part of charger system 200, main control ECU 208 closes switch 204 to initiate power feeding. Main control ECU 314 operates AC/DC converter 310 to effect charging of main battery 302.

When charging is completed, the state of charge SOC of main battery 302 will become higher than the predetermined value. In response, main control ECU 314 stops AC/DC converter 310, and changes switch 322 from a closed state to an open state. Then, suspension of power feeding is requested to charger system 200 via power transmission line communication unit 316. In response, main control ECU 208 changes switch 204 from a closed state to an open state.

A display device 214 and an input device 212 are provided at charger system 200. Display device 214 provides the display of the charge initiation time, the charge end time estimated from the state of charge, and the like. Input device 212 is used to enter an instruction to interrupt charging, after the operator attaches charge plug 206 with connector 324.

Charger system 200 further includes a front door lock sensing unit 216 to sense that the front door of a residence has been locked from outside by a key carried by the driver. When main control ECU 208 is notified of the driver locking the front door by an output from front door lock sensing unit 216, this notification is transmitted to main control ECU 314 via power transmission line communication unit 210, charge cable 218 and power transmission line communication unit 316.

Upon receiving this notification, main control ECU 314 issues a command to preheat canister 189 of FIG. 5 with heater 179 until charge plug 206 is removed from the vehicle by the driver, or until an elapse of a predetermined time.

Figure 9:
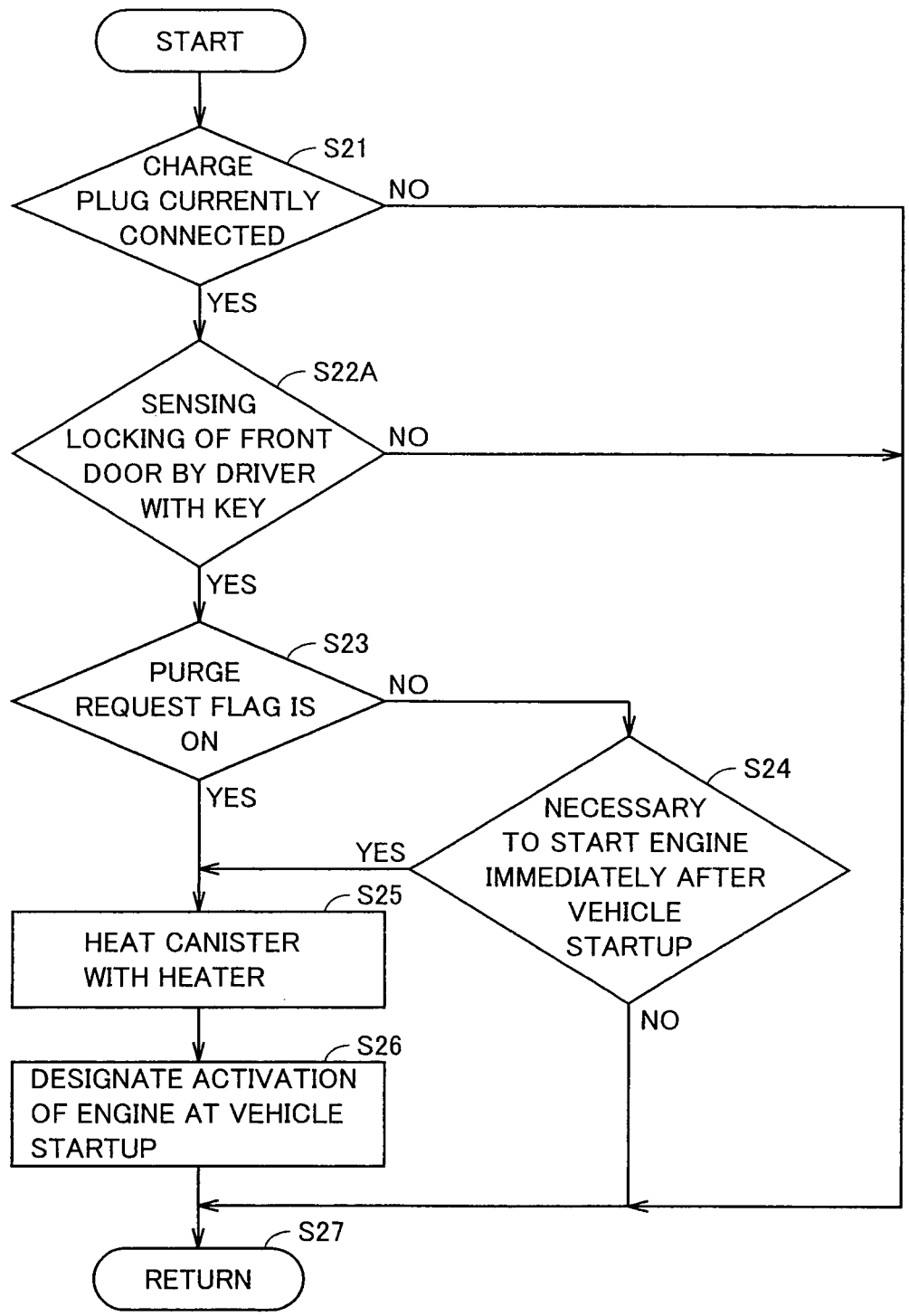
FIG. 9 is a flowchart to describe a canister preheat process executed by a main control ECU 314 according to a modification.

FIG. 9 is a flowchart to describe a canister preheating process executed by main control unit ECU 314 according to the modification.

The flowchart of FIG. 9 corresponds to the control of the flowchart described with reference to FIG. 7, and includes the process of step S22A instead of the process of step S22. The remaining elements other than step S22A are similarly carried out by main control ECU 314 instead of control device 60. Therefore, description thereof will not be repeated.

In the process of step S22A, main control ECU 314 of FIG. 8 is notified of front door lock sensing unit 216 sensing lock up of the front door by the driver with a key by power transmission communication through the charge cable. Upon receiving this notification, control proceeds from step S22A to step S23. In the absence of this notification, control proceeds from step S22A to step S27 to return to the main routine.

FIGS. 8 and 9 are based on the case where the locking of the front door is notified through power transmission line communication. Such notification can be made to the vehicle from the residence or the charger system through radio. Alternatively, a signal that previously notifies startup of the vehicle may be transmitted to the vehicle by radio through a remote control key or the like.

Namely, hybrid vehicle 100A includes a timer setting the expected startup time and/or front door lock sensing unit 216 to effect detection or estimation of the startup time of the vehicle. Main control ECU 314 corresponding to control device 60 of FIG. 5 operates heater 179 of FIG. 5 such that temperature increase is completed by the detected or estimated startup time.

FIGS. 1 and 8 represent the case where the vehicle and charger system are directly connected by a charge cable. A possible modification is to establish electrical connection in a non-contacting state by means of electromagnetic induction for power transmission/reception.

Accordingly, canister 189 of FIG. 5 is preheated with heater 179 based on the electric power supplied from an external source that can readily afford power until charge plug 206 is removed from the vehicle by the driver or until the elapse of a predetermined time. When the engine is started and a purge is conducted after startup of the vehicle, fuel vapor can be made to disengage readily from the canister. Further, the event of the battery power being consumed to affect the EV allowed travel distance can be suppressed, even if heating by the heater that requires large electric power is carried out.

By preheating the canister, the duration f operating the engine for a purge can be reduced.

The control method set forth above can be executed with software using a computer. A program to cause a computer to execute the control method set forth above may be read out from a recording medium (ROM, CD-ROM, memory card, and the like) recorded with the program in a computer-readable manner into the computer present in the control device of the vehicle, or presented through a communication line.

The present embodiment corresponds to an application to a series/parallel type hybrid system that can transmit power by dividing the engine power to the axle and power generator by a power split mechanism. The present invention is also applicable to a series type hybrid vehicle that employs only the engine for driving the power generator and that generates the driving force of the wheel with only the motor that uses the electric power generated by the power generator.

It should be understood that the embodiments and examples disclosed herein are illustrative and non-restrictive in every respect. The scope of the present invention is defined by the terms of the claims, rather than the description above, and is intended to include any modification within the scope and meaning equivalent to the terms of the claims.

The invention claimed is:

1. A hybrid vehicle configured to allow charging from a power supply external to the vehicle, comprising:
   a power storage device;
   a connector unit configured to electrically connect said power storage device with said external power supply;
   an absorption unit configured to absorb fuel vapor, the absorption unit includes a canister storing an adsorbent to which said fuel vapor adheres;
   an activation unit configured to activate said absorption unit to facilitate disengagement of said fuel vapor with power received from said external power supply during connection of said power storage device with said external power supply by said connector unit, the activation unit includes a heater for receiving electric power from at least one of said power storage device and said external power supply to heat said canister;
   a purge mechanism configured to conduct a purge relative to said canister, the purge mechanism includes an internal combustion engine generating negative pressure; and
   a control device configured to control said heater and said purge mechanism, the control device operates said heater in advance prior to starting said internal combustion engine when determination is made that starting of said internal combustion engine is required at a next startup of the vehicle.

2. The hybrid vehicle according to claim 1, wherein said control device determines a saturation level of said canister and operates said heater and said purge mechanism when said saturation level is larger than a first value.

3. The hybrid vehicle according to claim 2, further comprising a time determination unit configured to detect or estimate a startup time of the vehicle, wherein said control device operates said heater such that temperature increase is completed before the detected or estimated startup time.

4. A control method for a hybrid vehicle comprising the steps of:
providing an external power supply and a hybrid vehicle configured to allow charging from the external power supply, the hybrid vehicle including a power storage device, a connector unit configured to electrically connect said power storage device with said external power supply, an absorption unit configured to absorb fuel vapor, the absorption unit includes a canister storing an adsorbent to which said fuel vapor adheres, an activation unit configured to activate said absorption unit to facilitate disengagement of said fuel vapor with power received from said external power supply during connection of said power storage device with said external power supply by said connector unit, the activation unit includes a heater receiving electric power from at least one of said power storage device and said external power supply to heat said canister, a purge mechanism configured to conduct a purge relative to said canister, the purge mechanism includes an internal combustion engine generating negative pressure; and a control device configured to control said heater and said purge mechanism, the control device operates said heater in advance prior to starting said internal combustion engine when determination is made that starting of said internal combustion engine is required at a next startup of the vehicle;
charging said power storage device with electric power from said external power supply,
operating said activation unit by the electric power applied from said external power supply,
operating said purge mechanism after an operation of said activation unit is initiated,
determining whether starting of said internal combustion engine is required at a next startup of the vehicle, and
operating said heater in advance prior to starting said internal combustion engine when determination is made that starting of said internal combustion engine is required at a next startup of the vehicle.

5. The hybrid vehicle according to claim 1, further comprising a time determination unit configured to detect or estimate a startup time of the vehicle, wherein said control device operates said heater such that temperature increase is completed before the detected or estimated startup time.

6. A control method for a hybrid vehicle comprising the steps of:
connecting an external power supply and the hybrid vehicle configured to allow charging from the external power supply, the hybrid vehicle including a power storage device, a connector unit electrically connecting said power storage device with said external power supply;
absorbing fuel vapor in an absorption unit that includes a canister storing an absorbent to which fuel vapor adheres;
activating the absorption step with a heater for receiving electric power from at least one of said power storage device and said external power supply to heat said canister in order to facilitate disengagement of said fuel vapor with power received from said external power supply during connection of said power storage device with said external power supply;
conducting a purge relative to said canister where an internal combustion engine generates a negative pressure;
controlling said heater and said purge mechanism where the heater may be operated in advance prior to starting said internal combustion engine;
charging said power storage device with electric power from said external power supply;
operating said purge step after an operation of said activation step is initiated;
determining whether starting of said internal combustion engine is required at a next startup of the vehicle; and
operating said heater in advance prior to starting said internal combustion engine when determination is made that starting of said internal combustion engine is required at a next startup of the vehicle.

* * * * *